United States Patent
Ragazzi et al.

(10) Patent No.: US 10,603,982 B2
(45) Date of Patent: Mar. 31, 2020

(54) VEHICULAR CLIMATE CONTROL SYSTEM

(71) Applicant: Ford Global Technologies, LLC, Dearborn, MI (US)

(72) Inventors: Franco Ragazzi, Ann Arbor, MI (US); James George Gebbie, Rochester Hills, MI (US); Donald Peter Schneider, III, Commerce Twp, MI (US); Alan Douglas Wallington, Livonia, MI (US); William Stewart Johnston, South Lyon, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 170 days.

(21) Appl. No.: 15/788,468

(22) Filed: Oct. 19, 2017

(65) Prior Publication Data

US 2019/0118613 A1  Apr. 25, 2019

(51) Int. Cl.
  *B60H 1/00* (2006.01)
(52) U.S. Cl.
  CPC ......... *B60H 1/00807* (2013.01); *B60H 1/004* (2013.01); *B60H 1/00392* (2013.01); *B60H 1/00885* (2013.01); *B60H 2001/0015* (2013.01); *F01P 2060/06* (2013.01); *F01P 2060/08* (2013.01)
(58) Field of Classification Search
  CPC ............ B60H 1/00807; B60H 1/00392; B60H 1/004; B60H 1/00885; B60H 2001/0015; B60H 1/00642; B60H 1/0073; B60H 1/00764; B60H 2001/00733; B60H 1/00; F01P 2060/06; F01P 2060/08

USPC ........ 123/406.11–406.76, 41.01–41.86, 366; 165/271, 202
  See application file for complete search history.

(56) References Cited

U.S. PATENT DOCUMENTS

| | | | | |
|---|---|---|---|---|
| 4,226,220 A | * | 10/1980 | Suzuki | F02P 5/103 123/406.69 |
| 4,745,902 A | * | 5/1988 | Yagi | F02P 5/1455 123/406.42 |
| 4,782,795 A | * | 11/1988 | Kubozuka | F01P 3/2285 123/406.35 |
| 5,390,632 A | * | 2/1995 | Ikebe | F01P 7/164 123/41.02 |
| 5,483,927 A | * | 1/1996 | Letang | B60K 31/045 123/322 |
| 5,735,238 A | * | 4/1998 | Russ | F01P 3/02 123/41.29 |
| 7,328,852 B2 | | 2/2008 | Paolillo et al. | |
| 8,740,103 B2 | | 6/2014 | Major et al. | |

(Continued)

*Primary Examiner* — Justin M Jonaitis
(74) *Attorney, Agent, or Firm* — Vichit Chea; Brooks Kushman, P.C.

(57) ABSTRACT

A vehicular climate control system may include a coolant subsystem configured to circulate coolant between an engine, a thermal generator, and a cabin heat exchanger, and a controller. The controller may be configured to, responsive to an air inlet temperature of the heat exchanger exceeding a threshold, retard engine spark timing to increase heat generation. The threshold may be defined by a quotient of (i) a difference between a discharge temperature target and the air inlet temperature and (ii) a thermal effectiveness parameter that is based on an air flow rate and a coolant flow rate.

16 Claims, 4 Drawing Sheets

(56) References Cited

U.S. PATENT DOCUMENTS

| | | | | |
|---|---|---|---|---|
| 2008/0196877 A1* | 8/2008 | Zeigler | ............ | B60H 1/00907 |
| | | | | 165/202 |
| 2009/0020620 A1* | 1/2009 | Douarre | ............ | B60H 1/00278 |
| | | | | 237/12.3 R |
| 2011/0083426 A1* | 4/2011 | Ikemoto | ................ | F01N 3/043 |
| | | | | 60/286 |
| 2011/0197853 A1* | 8/2011 | Takeishi | .................... | F01N 5/02 |
| | | | | 123/406.45 |
| 2012/0074238 A1* | 3/2012 | Morita | ............... | F02D 13/0249 |
| | | | | 237/5 |
| 2016/0347150 A1* | 12/2016 | Kakade | ............ | B60H 1/00885 |
| 2016/0377022 A1* | 12/2016 | Tofukuji | ................ | F02F 1/10 |
| | | | | 123/41.82 R |

\* cited by examiner

VEHICULAR CLIMATE CONTROL SYSTEM

TECHNICAL FIELD

This application generally relates to a climate control system for a vehicle.

BACKGROUND

Conventional vehicles and some electrified vehicles such as hybrid-electric vehicles (HEVs) rely on an internal combustion engine for multiple purposes including providing power for propulsion, hydraulic systems, and to generate electric power. An occupant in the vehicle may request a specific cabin temperature for comfort.

SUMMARY

A vehicular climate control system may include a coolant subsystem configured to circulate coolant between an engine, a thermal generator, and a cabin heat exchanger, and a controller. The controller may be configured to, responsive to an air inlet temperature of the heat exchanger exceeding a threshold, retard engine spark timing to increase heat generation.

A method of controlling a vehicular climate control system, by a controller, circulating coolant in a coolant subsystem to heat a heater core associated with a vehicular passenger compartment, and responsive to output from an air inlet sensor arranged upstream the heater core exceeding a threshold, retarding engine spark timing to increase heat generation.

A climate control system may include a coolant subsystem that circulates coolant between an engine and a heater core; and a controller. The controller may be configured to, responsive to an air inlet temperature of the heater core exceeding a threshold, increase an idle rotational speed of the engine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
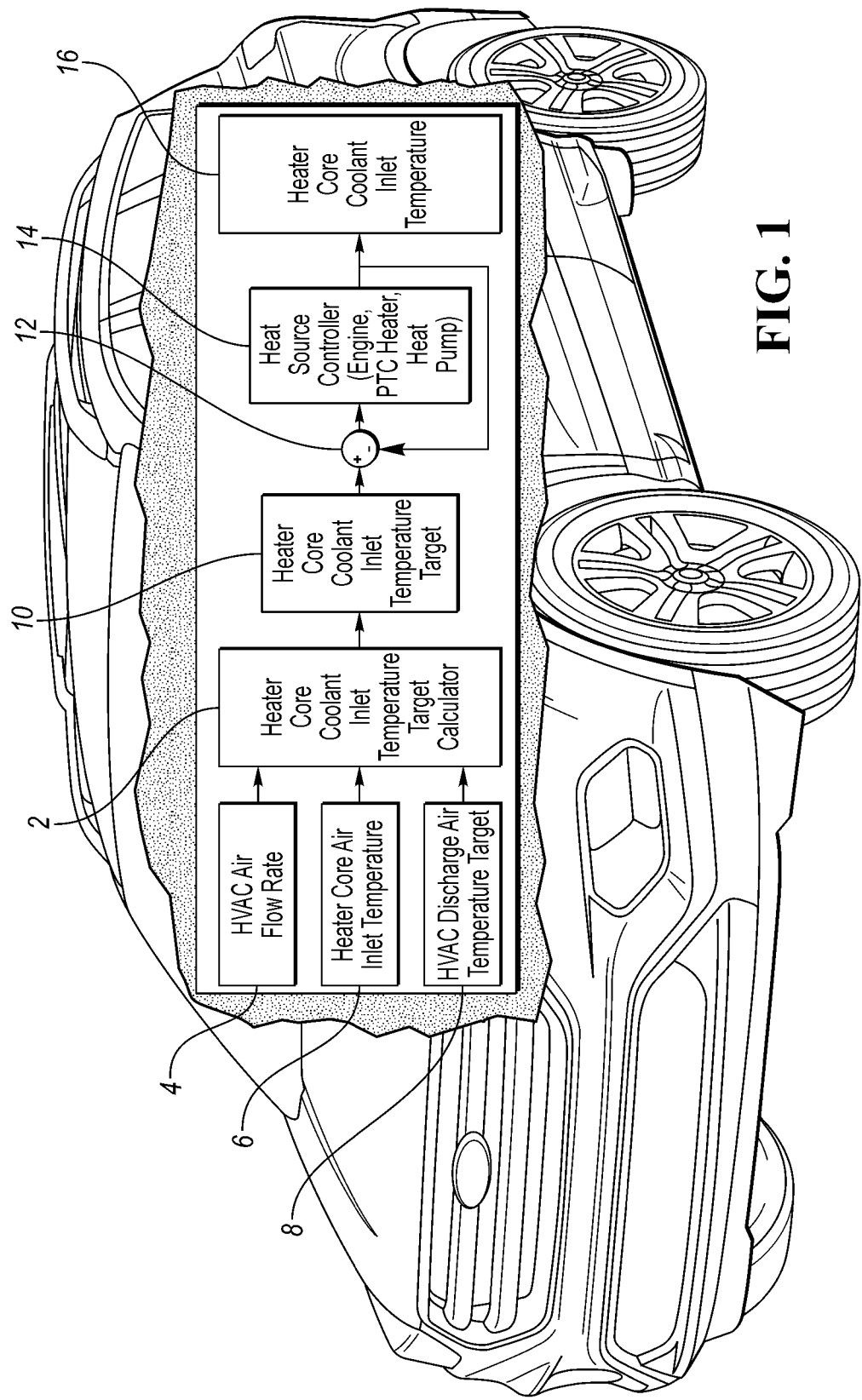
FIG. 1 is a diagram of a climate control system for a vehicle.

Often climate control coolant temperature targets are imprecise in that, based on the targets, the climate control over-drives the climate system such that the true discharge air is in excess of the actual customer need. In non-electrified vehicles, this over compensation is of little consequence as the nature of the heat source, waste heat from the engine (e.g., internal combustion engine (ICE)) is often considered to be free. However, electrified vehicles often use a thermal generator including an electric or electrically powered heater (e.g., a resistance wire heater, a positive temperature coefficient (PTC) heater, or a thermoelectric device) to provide cabin heating when engine heat is unavailable. The heat generated by the heater is typically proportional to a current passed through the heater. The use of electric or electrically powered heaters is especially a concern with pure EVs in which there is no ICE at all. Therefore, refinement of the coolant temperature needs to warm the cabin is desirable. Doing so may lead to decreased fuel usage in Hybrid variants, and increased electric range in EVs (or PHEVs operating in EV mode). In this application, the term heater core will be used to describe a cabin heat exchanger. Generally, a cabin heat exchanger can be used to heat or cool a cabin compartment Here, a heater core air flow, a heater core air inlet temperature, and an HVAC discharge air temperature target is used to calculate a target heater core coolant inlet temperature for a given choice of a heater core coolant flow rate. The system that controls the heat source (such as a powertrain controller in the case of an internal combustion engine) would select the heater core coolant flow based on performance considerations such as noise, vibration, and harshness (NVH), pump capacity, etc. As shown in FIG. 1 the heater core coolant flow (not shown), heater core air flow 4, heater core air inlet temperature 6, and discharge air temperature target 8 are inputs to a heater coolant inlet temperature target calculator 2. This target (i.e., the output from block 2 and input of block 10) would be input to a heater core coolant inlet temperature target block 10 that would be combined (in block 12) with negative feedback from a heat source controller 14 to guide output capacity of a heat source based on the heater core coolant inlet temperature 16. Also, the use of the heater core coolant flow and heater core air flow may be used to calculate a heating effectiveness of the heating, ventilation, and cooling (HVAC) system as the heating effectiveness is primarily driven by the heater core effectiveness. After an effectiveness has been calculated, calculating a coolant temperature target is a straight forward calculation based on the definition of effectiveness.

Here, a climate control system for a vehicle is disclosed that controls vehicular systems including a non-climate control system (e.g., a powertrain system) based on a desired cabin temperature. To attain the desired cabin temperature, the climate control system adjusts the vehicular system based on a comparison of an output from an air inlet sensor and a difference (e.g., between an air temperature target and a coolant inlet temperature of the heater core) divided by a thermal effectiveness (e.g., is a difference between an air flow rate and a coolant flow rate) dropping below the coolant inlet temperature. The controller may then retard engine spark timing to increase heat generation. In other words, the thermal effectiveness parameter is a ratio of the actual heat transfer rate of the heat exchanger (e.g., heater core) to a maximum heat transfer rate that the heat exchanger is capable of producing.

Operation of an internal combustion engine (ICE), for example a four stroke ICE, includes drawing in a fuel/air mixture into a cylinder by a creating a low pressure as a piston travels away from the cylinder head and spark plug. When the piston is farthest from the cylinder head, (i.e., at the bottom) a value closes so as the piston travels towards the cylinder head the fuel/air mixture is compressed. Originally, when the cylinder reached the top (i.e., closest to the head and spark plug) an electrical pulse was applied to the spark plug to create a spark at the spark plug gap. However, as the rotational speed of the ICE increases, the timing of the spark may be advanced. Timing advance refers to a number of degrees at which the spark is fired before top dead center (BTDC) so that the spark is created to ignite the air-fuel mixture in the combustion chamber during the compression stroke. Conversely, to retarded timing may be defined as changing the timing so that fuel ignition happens later than the manufacturer's specified time at a rotational speed. For example, if the engine manufacturer specifies at a rotational speed to set the ignition timing at 12 degrees BTDC, the time is said to be retarded if the ignition is adjusted to 11 degrees BTDC. Timing advance compensates for a burn time of the air-fuel mixture. Igniting the mixture before the piston reaches top dead center (TDC) allows the mixture to reach a full burn after the piston reaches TDC. When the air-fuel mixture is ignited at the correct time, a maximum pressure in the cylinder occurs sometime after the piston reaches TDC allowing the ignited mixture to push the piston down the cylinder with the greatest force. When the spark is retarded relative to the piston position, the maximum cylinder pressure occurs after the piston is already traveling down the cylinder, resulting in lost power (i.e., horsepower) and overheating. Here, the spark is retarded to increase heat generation at the expense of generating less propulsive force.

Figure 2:
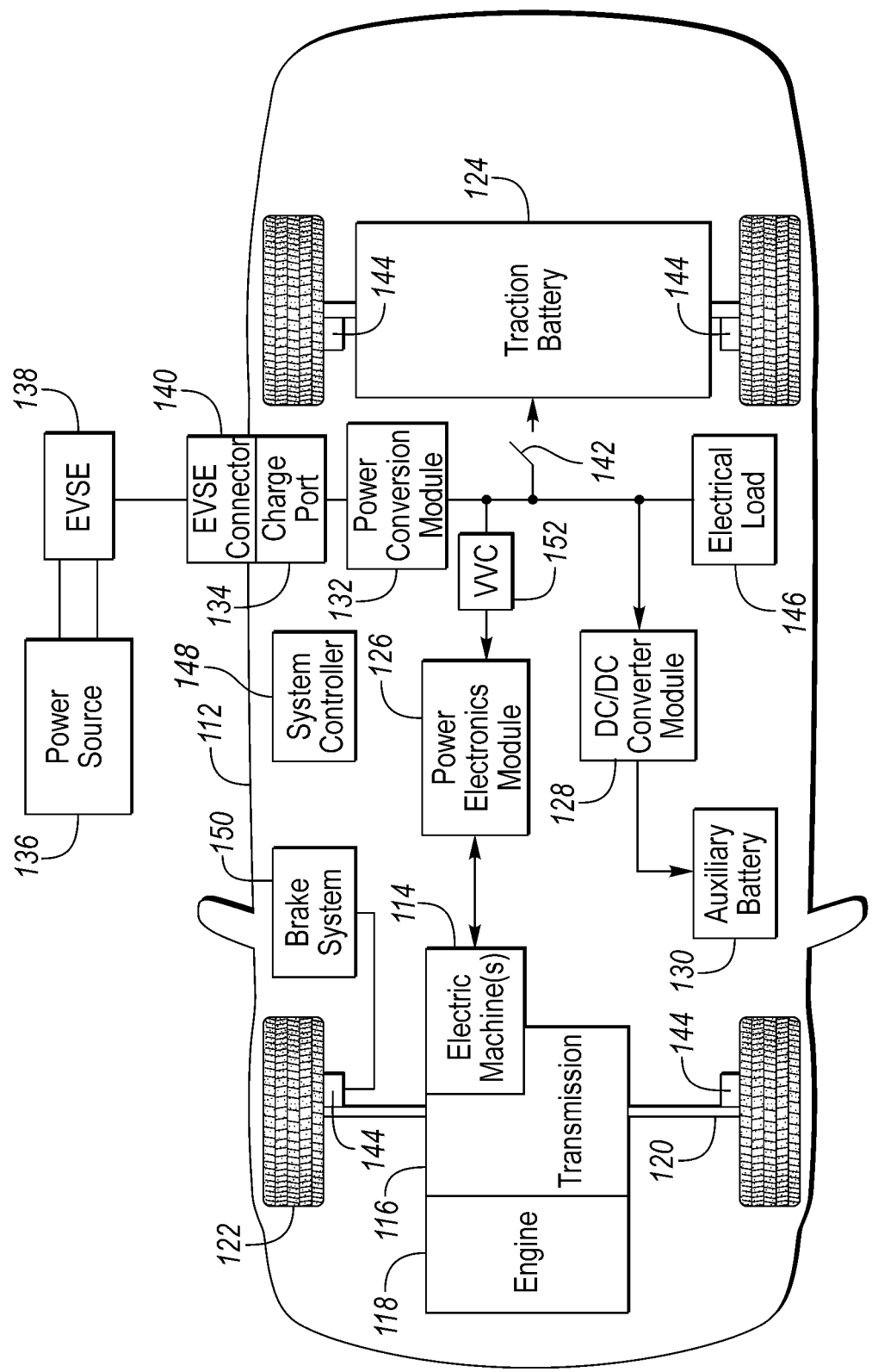
FIG. 2 is a diagram of a hybrid vehicle illustrating typical drivetrain and energy storage components.

FIG. 2 depicts a vehicle, and specifically an electrified vehicle 112 that may be referred to as a plug-in hybrid-electric vehicle (PHEV). Although a PHEV is illustrated in FIG. 2, the concepts also apply to traditional vehicles as elements of a traditional vehicle are a sub-set of the components shown in the EV 112. Although an EV is used for reference, Here, a plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 2 but it may be implied that the vehicle network may connect to any electronic module that is present in the vehicle 112. A vehicle system controller (VSC) 148 may be present to coordinate the operation of the various components.

Often the VVC 152 is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller that monitors and controls electrical parameters (e.g., voltage and current) at various locations within the VVC 152. In some configurations, the VVC controller may be included as part of the VVC 152. The VVC controller may determine an output voltage reference, $V^*_{dc}$. The VVC controller may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller may command the VVC 152 to provide the desired output voltage using the control signal. The particular control signal at which the VVC 152 is operated may be directly related to the amount of voltage boost to be provided by the VVC 152.

With reference to FIG. 2, the VVC 152 may boost or "step up" the voltage potential of the electrical power provided by the traction battery 124. The traction battery 124 may provide high-voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor may be electrically coupled in parallel with the traction battery 124. The input capacitor may reduce any voltage and current ripple. The VVC 152 may receive the HV DC power and boost or "step up" the voltage potential of the input voltage according to the duty cycle. Often an output capacitor is electrically coupled between the output terminals of the VVC 152 and the input of the power electronics module 126 to stabilize the bus voltage and reduce voltage and current ripple at the output of the VVC 152.

Figure 3:
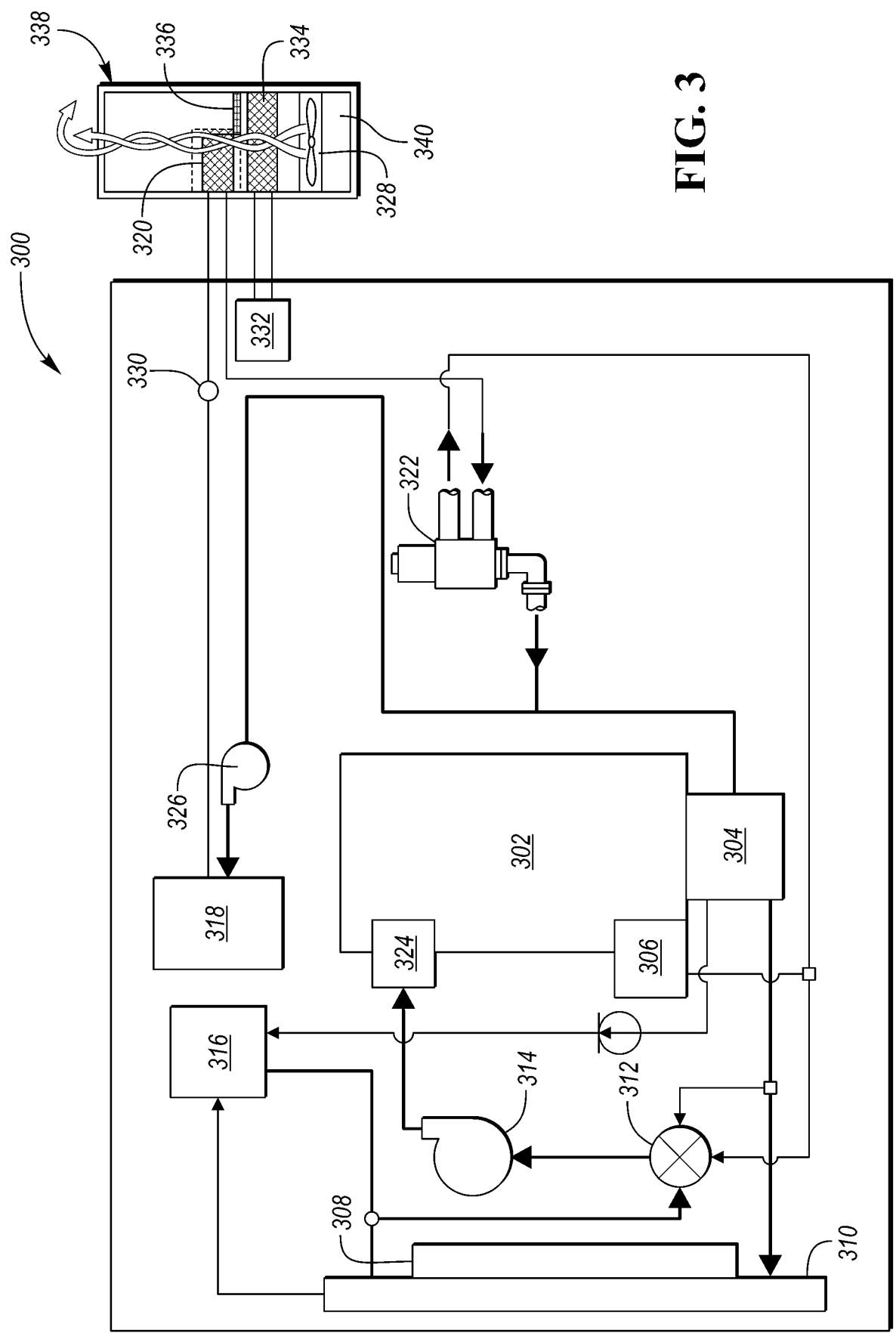
FIG. 3 is a schematic diagram of a heating, ventilation, and air conditioning (HVAC) system including an internal combustion engine (ICE) and a heater core.

FIG. 3 is a schematic diagram of a heating, ventilation, and air conditioning (HVAC) system 300 also referred to as a coolant subsystem that includes an internal combustion engine (ICE) 302 and a heater core 320. The engine 302 as it operates generates heat as a waste product of combustion. To cool the engine 302, a coolant is circulated through the engine 302 via a coolant inlet port 324 and a coolant outlet port 304. The outlet 304 splits the heated coolant to flow to a radiator 310, a thermostat 312, a degas bottle 316 and an HVAC electric pump 326. The thermostat 312 controls the flow of coolant to a main electric pump 314 such that if the temperature of the coolant is below a threshold, the thermostat 312 channels coolant from the outlet 304 to the electric pump 314 bypassing the radiator 310. If the temperature of the coolant is above the threshold, the thermostat 312 channels coolant through the radiator 310 to the electric pump. In some embodiments, if the temperature of the coolant exceeds a high threshold, an electric fan 308 is activated to facilitate air flow through the radiator cooling the coolant. Coolant that flows from the outlet 304 to the HVAC electric pump 326 the may flow through a thermal generator 318 (such as an electric heater). The thermal generator 318 may include a resistive wire heater, a positive temperature coefficient (PTC) heater, a heat pump, or other electric heat source. The coolant flow rate and temperature is measured by sensor 330 after which the coolant passed to a heater core 320 to a downstream valve 322 (also referred to as a heater core isolation valve). The downstream value 322 is also referred to as a heater core isolation value (HCIV). The heater core 320 is often located in the passenger compartment within the passenger compartment HVAC subsystem 338 that includes an electric fan 328, an evaporator 334, a condenser/compressor 332, an air filter 340, and a passenger compartment filter 336. The air inlet draws air in through the air filter 340 at an inlet air temperature and exits after passing through the heater core 320 or evaporator 334. The desired air temperature is the discharge air temperature which is controlled to be at a discharge air temperature target to change a cabin temperature based on a HVAC controller. The electric heater 318 may increase a temperature of the coolant to provide the heater core 320 with warmer coolant so the desired output temperature of the passenger compartment HVAC subsystem 338 can meet the requirements to obtain the desired temperature in the passenger compartment. Along with generating heat, the thermal generator 318 may be used to remove heat (e.g., cool) via a vapor compression heat pump or a thermoelectric heat pump. Such that in another embodiment, elements 332 and 334 are removed and their functionality is performed by elements 318 and 320. Based on the heater core isolation valve position, the flow will either be valve 322 to electric pump 326 or valve 322 to thermostat 312.

Figure 4:
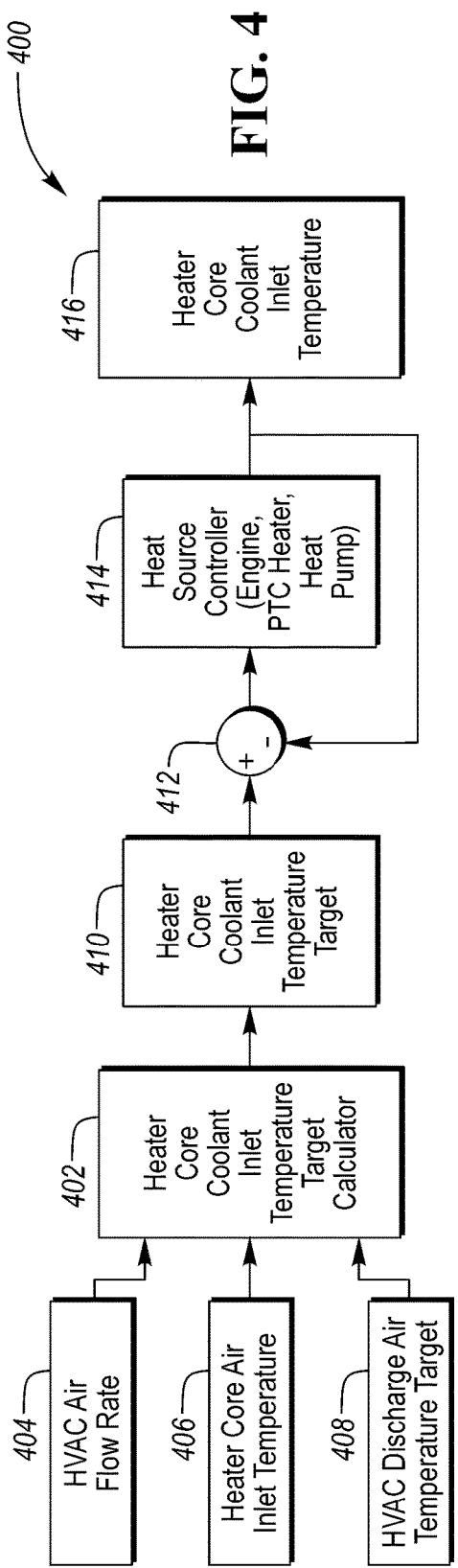
FIG. 4 is a flow diagram of a heating, ventilation, and air conditioning (HVAC) climate control system that is based on an inlet temperature.

FIG. 4 is a heating, ventilation, and air conditioning (HVAC) climate control system flow diagram 400 that is based on an inlet temperature.

Here, a heater core air flow (e.g., based on a speed of the fan 328, and a ventilation mode of operation such as recirculate, defrost, floor heat, etc.) a heater core air inlet temperature (e.g., based on a temperature of air flowing past the evaporator 334), and an HVAC discharge air temperature target (e.g., an estimated temp to raise a cabin temperature to a desired temperature) is used to calculate a target heater core coolant inlet temperature (e.g., estimated temperature at sensor 330) for a given heater core coolant flow rate. The system that controls the heat source (such as a powertrain controller in the case of an internal combustion engine or a PTC controller for a PTC heater) may operate the heater core subsystem to achieve a coolant flow based on performance considerations such as engine cooling, pump energy use, noise, vibration, and harshness (NVH), etc. As shown in FIG. 4 a heater core coolant inlet temperature target calculator 402 receives input from multiple sources indicative of multiple parameters including an HVAC air flow 404, a heater core air inlet temperature 406, and a discharge air temperature target 408. The target calculator 402 outputs a signal to drive the HVAC subsystem to a heater core coolant inlet temperature target in block 410. The target is then compared, via signal feedback, with the actual heater core coolant inlet temperature 416 in block 412 to guide output capacity of a heat source. The heat source controller 414 includes a powertrain controller and an electric heat controller. The powertrain controller may increase an idle rotational speed of the engine to increase the generation of heat, and if operating and providing a propulsive force, the powertrain controller may increase a fuel flow and retard engine spark timing to increase heat generation while maintaining the requested mechanical horsepower output from the engine (e.g. 302). Also, a current may be applied to an electric heater (e.g., heater 318) to increase a temperature of the coolant prior to circulating to the heat core (e.g., 320).

Figure 5:
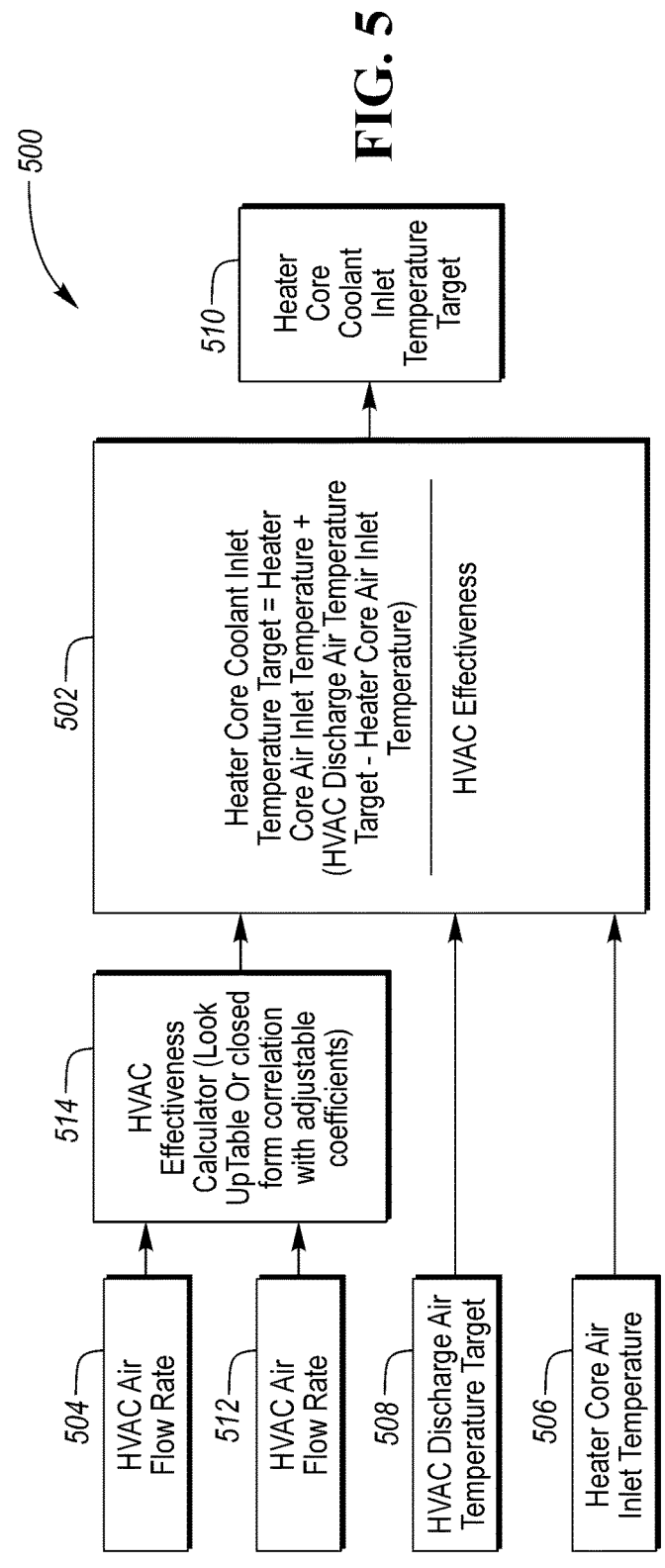
FIG. 5 is a flow diagram of a climate control system in which a heater core coolant flow and a heater core air flow are used to calculate a heating effectiveness of a heating, ventilation, and air conditioning (HVAC) system.

FIG. 5 is a climate control system flow diagram 500 in which at least a heater core coolant flow 504 and an HVAC air flow 512 are used to calculate an HVAC heating effectiveness 514. The heater core coolant flow 504 may be based on an output from a coolant flow sensor or it may be based on characteristics such as a coolant temperature, a pump speed, or a coolant pressure. The HVAC air flow 512 may be based on an output from an air flow sensor or it may be based on characteristics such as an ambient temperature, a fan speed, atmospheric pressure, or an HVAC operation mode. An HVAC operation mode includes vent flow paths such as defrost, floor, front vent, recirculate, and bypass. Thus, air flow may be determined via calibration as a function of the HVAC operation mode. The HVAC heating effectiveness 514 in an embodiment is calculated dynamically, and in another embodiment, the HVAC heating effectiveness 514 is calculated off-line and stored in a lookup table for quick access. In yet another embodiment, the HVAC heating effectiveness 514 is partially calculated off-line and stored as a matrix such that multiple variables are used to calculate the effectiveness. And in a further embodiment, the HVAC heating effectiveness 514 uses a closed form correlation with adjustable coefficients to determine the effectiveness. The output of HVAC heating effectiveness 514 is forwarded to temperature target calculator 502 that calculates a heater core coolant inlet temperature target based on input including the effectiveness from block 514, a HVAC discharge air temperature target block 508 and a heater core air inlet temperature block 506. Here the HVAC discharge air temperature target block 508 may be a calculation based data such as a desired cabin temperature and a current cabin temperature, and a heater core air inlet temperature block 506 may be an output from a temperature sensor or may be based other data such as an ambient temperature, a fan speed, or a HVAC mode of operation. In one embodiment, the heater core coolant inlet temperature target is proportional to the inverse of the HVAC effectiveness (e.g., from the HVAC effectiveness calculator 514) multiplied by a difference of a HVAC discharge air temperature target and a heater core air inlet temperature. The product of the inverse and difference is then added to a heater core air inlet temperature that results in the heater core coolant inlet temperature target. That is then forward to the heater core coolant inlet temperature target block 510 which is used in FIG. 4 to operate the powertrain and electric heater.

FIG. 5 provides the details of the target calculation. Specifically, it shows that the heater core coolant flow and heater core air flow are used to determine the heating effectiveness of the HVAC which is primarily driven by the heater core effectiveness. With knowledge or the effectiveness, a controller may determine the coolant temperature target based on the definition of effectiveness. It should be noted that the form of the equation presented here assumes that the minimum heat transfer fluid capacitance is always on the air side, however this is equation may also be used in other instances.

The climate control system described above may help decrease the energy cost of heat provided by supplementing heat provided by an engine or vehicle power source. More specifically, the HVAC subsystem may generate and provide additional heat to coolant that may be used to heat the passenger compartment of a vehicle. Moreover, the climate control system may facilitate the commonization of climate control system components, such as heater core and/or ventilation system designs. As such, common heater core and/or ventilation systems may be provided with vehicles having different powertrain configurations, such as models having internal combustion engine and hybrid electric drivetrain options.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicular climate control system comprising:
    a coolant subsystem configured to circulate coolant between an engine, a thermal generator, and a cabin heat exchanger; and
    a controller configured to, responsive to an air inlet temperature of the heat exchanger exceeding a threshold, retard engine spark timing to increase heat generation, wherein the threshold is defined by a quotient of (i) a difference between a discharge temperature target and the air inlet temperature and (ii) a thermal effectiveness parameter, and wherein the thermal effectiveness parameter is based on a difference between an air flow rate and a coolant flow rate.

2. The vehicular climate control system of claim 1, wherein the controller is further configured to, responsive to a parameter proportional to the difference between the discharge temperature target and the air inlet temperature falling below the air inlet temperature, increase an idle rotational speed of the engine.

3. The vehicular climate control system of claim 1, wherein the coolant flow rate is based on a configuration of the coolant subsystem including a thermostat position, a heater core isolation value position, a main pump speed, and a HVAC pump speed.

4. The vehicular climate control system of claim 1, wherein the coolant flow rate is based on an output from a flowmeter.

5. The vehicular climate control system of claim 1, wherein the thermal generator is an electric heater, and the controller is further configured to, responsive to a parameter proportional to the difference between the discharge temperature target and the air inlet temperature exceeding the air inlet temperature, reduce a current how to the electric heater.

6. The vehicular climate control system of claim 5, wherein the electric heater is a resistive heater or a positive temperature coefficient (PTC) heater.

7. The vehicular climate control system of claim 1, wherein the thermal generator is a thermal electric heat pump or a vapor compression heat pump configured to provide cabin heating or cooling, and the controller is further configured to, responsive to a parameter proportional to the difference between the discharge temperature target and the air inlet temperature exceeding the air inlet temperature, switch the thermal generator from a heating mode to a cooling mode.

8. A method of controlling a vehicular climate control system, comprising:
    by a controller,
        circulating coolant in a coolant subsystem to heat a heater core associated with a vehicular passenger compartment; and
        responsive to output from an air inlet sensor arranged upstream the heater core exceeding a threshold, retarding engine spark timing to increase heat generation, wherein the threshold is defined by a quotient of (i) a difference between a discharge temperature target and an air inlet temperature and (ii) a thermal effectiveness parameter that is based on a difference between an air flow rate and a coolant flow rate.

9. The method of claim 8 further comprising, by the controller, responsive to a parameter proportional to the difference between the discharge temperature target and an air inlet temperature falling below the air inlet temperature, increasing an idle rotational speed of the engine.

10. The method of claim 8 further comprising, responsive to a parameter proportional to the difference between the discharge temperature target and the air inlet temperature exceeding the air inlet temperature, reducing a current flow to an electric heater.

11. The method of claim 10, wherein the electric heater is a resistive heater or a positive temperature coefficient (PTC) heater.

12. The method of claim 8 further comprising, by the controller, responsive to a parameter proportional to the difference between the discharge temperature target and the air inlet temperature exceeding the air inlet temperature, transitioning a thermal generator from a heating mode to a cooling mode, wherein the thermal generator is a thermal electric heat pump or a vapor compression heat pump.

13. A climate control system comprising:
a coolant subsystem that circulates coolant between an engine and a heater core; and
a controller configured to, responsive to an air inlet temperature of the heater core exceeding, a threshold, increase an idle rotational speed of the engine, wherein the threshold is defined by a quotient of (i) a difference between a discharge temperature target and the air inlet temperature and (ii) a thermal effectiveness parameter that is based on an air flow rate and a coolant flow rate.

14. The climate control system of claim 13, wherein the controller is further configured to, responsive to a parameter proportional to the difference between the discharge temperature target and the air inlet temperature falling below the air inlet temperature, increase an idle rotational speed of the engine.

15. The climate control system of claim 13, wherein the coolant subsystem further includes an electric heater, and the controller is further configured to, responsive to a parameter proportional to the difference between the discharge temperature target and the air inlet temperature exceeding the air inlet temperature, reduce a current flow to the electric heater, wherein the electric heater is a resistive heater or a positive temperature coefficient (PTC) heater.

16. The climate control system of claim 13, wherein the coolant subsystem further includes a thermal generator that is a thermal electric heat pump or a vapor compression heat pump configured to provide cabin heating or cooling, and the controller is further configured to, responsive to a parameter proportional to the difference between the discharge temperature target and the air inlet temperature exceeding the air inlet temperature, switch the thermal generator from a heating mode to a cooling mode.

* * * * *